(12) United States Patent
Martin et al.

(10) Patent No.: US 10,919,265 B2
(45) Date of Patent: Feb. 16, 2021

(54) JOINING FILMS/FOILS OF INTERMEDIATE LAYERS

(71) Applicant: GEORG MARTIN GMBH, Dietzenbach (DE)

(72) Inventors: Christoph Martin, Dietzenbach (DE); Daniel Vögele, Aschaffenburg (DE)

(73) Assignee: GEORG MARTIN GMBH, Dietzenbach (DE)

( * ) Notice: Subject to any disclaimer, the term of this patent is extended or adjusted under 35 U.S.C. 154(b) by 23 days.

(21) Appl. No.: 16/080,219

(22) PCT Filed: Jul. 8, 2016

(86) PCT No.: PCT/EP2016/066284
§ 371 (c)(1),
(2) Date: Aug. 27, 2018

(87) PCT Pub. No.: WO2017/153007
PCT Pub. Date: Sep. 14, 2017

(65) Prior Publication Data
US 2019/0016090 A1    Jan. 17, 2019

(30) Foreign Application Priority Data
Mar. 7, 2016   (DE) .................. 10 2016 203 691

(51) Int. Cl.
| | | |
|---|---|---|
| B32B 7/12 | (2006.01) | |
| F16B 43/00 | (2006.01) | |
| F16B 5/02 | (2006.01) | |
| F16B 11/00 | (2006.01) | |
| B32B 7/04 | (2019.01) | |
| B29C 65/02 | (2006.01) | |
| B29L 9/00 | (2006.01) | |

(52) U.S. Cl.
CPC ............. *B32B 7/12* (2013.01); *B29C 65/02* (2013.01); *B32B 7/04* (2013.01); *F16B 5/025* (2013.01); *F16B 11/006* (2013.01); *F16B 43/00* (2013.01); *B29L 2009/003* (2013.01)

(58) Field of Classification Search
CPC ... B32B 7/12; B29C 65/02; F16B 5/08; F16B 5/025
See application file for complete search history.

(56) References Cited

U.S. PATENT DOCUMENTS

| | | | | |
|---|---|---|---|---|
| 1,768,652 A | * | 7/1930 | Clifford | .................. F16C 23/00 384/626 |
| 4,526,641 A | | 7/1985 | Schriever et al. | |
| 2010/0166340 A1 | * | 7/2010 | Bailey | .................. B65D 33/001 383/37 |

FOREIGN PATENT DOCUMENTS

| | | |
|---|---|---|
| DE | 69108628 T2 | 8/1995 |
| DE | 60208922 T2 | 9/2006 |
| DE | 202012010418 U1 | 11/2012 |
| DE | 102012018036 A1 | 3/2014 |
| EP | 0667233 B1 | 6/2000 |

OTHER PUBLICATIONS

International Search Report for International Application No. PCT/EP2016/066284 dated Nov. 4, 2016.

* cited by examiner

*Primary Examiner* — Elizabeth E Mulvaney
(74) *Attorney, Agent, or Firm* — Nexsen Pruet, PLLC; Seth Hudson

(57) ABSTRACT

The invention generally relates to intermediate layers (shim-type stacked foils/films) as adjusting elements for mechanical structures.

7 Claims, No Drawings

JOINING FILMS/FOILS OF INTERMEDIATE LAYERS

FIELD OF THE INVENTION

The present invention generally relates to shims (tolerance compensation layer sheets) as adjusting elements for mechanical constructions.

BACKGROUND OF THE INVENTION

In detail, the invention relates to shims in which the sheets (spacer disks) are bonded to one another by welding, especially of the lateral surfaces, in a first embodiment.

According to the invention, shims are products for underlaying in machines for the purpose of compensating tolerance deviations.

This means products for underlaying that compensate a production tolerance of mechanical components, intended to simplify the function of adjusting the play when mechanical components are mounted. If such tolerances are not compensated for, there will be more wear, for example. The use of shims dispenses with machine (post) processing, for example, by the finishing cut of a bolt-on flange or the later grinding of a spacer disk. For this reason, shims are employed in many industrial fields, especially in aerospace engineering and in large-scale machines (for example, as engine underlays or ball bearing gauge rings).

In the industry, three or four variants with different advantages have become established. In addition to the type of production and the materials employed, they also differ by their possible applications: The most conventional ones are solid shims that consist of a single layer and can be combined with one another to create a tolerance compensation by adding different solid shims. In addition, there are shim concepts that create the necessary tolerance compensation by removing existing metal plates or foils (for example, by peeling off superfluous metal plates) rather than adding further shims.

The most common method is the use of solid shims that usually consist of a single layer. The advantage of such shims over edge-bonded or laminated shims mainly resides in their inexpensive production because the production process is completed with the metallic processing of the metal plate, i.e., the cutting of the semifinished material. In special cases, solid shims are prepared in any desired thickness grades, which are mostly small, and with low thickness tolerances, usually by grinding: For example, 1.00 mm/1.03 mm/1.06 mm etc. If sold together, they can be used as an assorted kit. However, there are also precision sheets with a thickness of one or more hundredths of millimeters.

In edge-bonded shims of the prior art, individual sheets are bonded together by adhesive bonding at the front surfaces, for example, like in book spines or tear-off calendars, optionally also with circumferential bonded edges. As compared to the solid shims, several sheets are bundled or bonded together, thus yielding a package. Therefore, it is not necessary to prepare a solid shim tailored to the individual case, but the thickness of the shim can be adjusted on site to the existing difference. Thus, several sheets can be bonded together on one edge by a particular adhesive at one or more sites, and subsequently adjusted exactly to the necessary thickness by tearing off sheets that are not needed. Edge-bonded shims also combine packages with metal plates or foils of different materials and thicknesses. Although this method is more complicated in the production process because of the adhesive bonding, but during application offers the advantage that the edge-bonded shims can be adjusted to the necessary tolerance by simply tearing off the sheets on site.

In contrast to edge-bonded shims, laminated shims are glued completely with specific adhesives. This yields a multilayered and completely laminated, so-called "sandwich", structure. The bonding allows single or several layers to be detached without destroying the remaining part of the shim, or even adversely affect its function. Laminated peel-off metal sheets are high precision shims. In contrast to edge-bonded or solid shims, these shims are tailor-made as seemingly solid shims according to drawings provided by the client and provided with the necessary bores, so that they are ready to be incorporated. In contrast to their solid appearance, and unlike conventional shims, they consist of a large number of bonded individual sheets having a thickness of a few hundredths of millimeters (0.2 mm to 0.010 mm), but may also be bonded in combination with solid sheets. The assembler or maintainer can peel off the sheet layers to the measured thickness manually or with a tool.

So-called non-metallic peelable shims, often based on polyethylene terephthalate (PET), consist of several laminated plastic sheets having a thickness of from 0.025 mm to 0.50 mm. The plastic sheets already peeled off may also be reused.

Plastic shims are suitable, in particular, for lightweight constructions in which corrosion and electrical insulation are important, such as in vehicle construction, aeronautics as well as electrical engineering and measuring technology, but also generator and transformer construction, because the laminated layer sheet made of plastic can also adopt the insulation function in addition to tolerance compensation. However, the laminated plastic shims have lower mechanical strengths as compared to the metallic variants.

BRIEF SUMMARY OF THE INVENTION

Essentially, metallic precision bands and precision metal foils of stainless steel, non-alloyed steel, brass and/or aluminum, but also PET and optionally a composite material, serve as the starting material for the preparation of shims. Solid shims may generally be prepared from all kinds of semifinished products that are suitable for tolerance compensation because of their material properties (Wikipedia, DE, keyword: "Zwischenlagen", inquiry of Feb. 18, 2016).

EP 667 233 A describes peelable adjusting elements comprising a number of sheets (shims), between any two of which adhesive layers are inserted. The flat material sheets (films/foils) are made of metal or optionally of plastic.

U.S. Pat. No. 4,526,641 A describes a tolerance compensation intermediate layer consisting of a layering of thermally curing spacer disks bonded together by means of an adhesive of similar type, characterized by some intralaminar cohesive force.

From DE 69108628 T2, metal seals, such as cylinder head gaskets, have been known in which a base plate of metal is bonded by laser welding to shims or annular spacers. The welding may also be effected directly completely around the edge.

DE 10 2012 018 036 A1 describes stacks of individual battery cells, wherein the individual cells are inserted into a bag of sheets welded together.

DE 602 08 922 T2 relates to a tolerance compensation intermediate layer with a thickness that can be adjusted by exfoliation, a process for the preparation thereof, and the use thereof for producing shims. For this purpose, the product features alternating layering of flat material sheets (films)

and layers of an adhesive material, where each flat material sheet has an intrinsic resistance to tearing, and each layer of adhesive material connects two flat material sheets adjacent to each other in the pile by a bonding force that is weaker than the resistance of the flat material sheets to tearing, so that each flat material sheet can be detached from the stack without being torn.

The precited prior art documents have in common that the individual sheets mostly have the same thickness throughout the area in a given system, irrespective of whether they are made of metal, polymer sheet, a fabric, or a composite material, and are bonded together in part of the area, in the full area, and/or on the edge. In practice, however, it turns out that the bonding between the sheets is a disadvantage if the shims are employed, for example, between two curved components. The disadvantage arises from the fact that flat shims laminated in the whole area tend to delaminate when a particular radius of curvature is exceeded, which results from stress between the layers, leading to tearing of the adhesive laminations. This disadvantage can be avoided by performing the curing of the shims in half molds. In addition, bonding over the full area is disadvantageous when single spacer disks are peeled off, because it is usually necessary to use a tool. The book spine bonding also has some disadvantages: in the requirement that the shim must absorb transversal forces, which it can do only conditionally; due to the endangering of joint sites, which must have a high compactness; through the possible dissolution of the adhesive, which may result in undesirable residues in rolling bearings; in the requirement that no critical gases must be formed at high temperatures; in the requirement that sheet composites for shims must be prepared for high temperature applications; if the removal of layers from the shim "book" leaves adhesive residues that form an ugly adhesive bead, which would then have to be removed with a knife.

DETAILED DESCRIPTION OF THE INVENTION

In a first embodiment, the above object of the invention is achieved by edge-bonded or laminated shims comprising a plurality of sheets of the same or different kinds, characterized in that the sheets are bonded to one another by welding.

"Welding" means (according to EN 14610 and DIN 1910-100, as well as within the meaning of the present invention) the non-detachable bonding of components with the application of heat and/or pressure, with or without welding additives, wherein additives are rather not employed according to the invention.

According to the invention, the necessary welding energy is supplied from outside, wherein welding auxiliaries, such as protective gases, welding powders or pastes may facilitate welding, or even make it possible. Welding, also within the meaning of the present invention, is performed by supplying heat to melt the material or by supply of heat and additional exposure to force (pressure) on the stack of the sheets. Thus, the sheets are connected to one another in the edge region of the shims by the welded connection. In contrast to book spine bonding, however, no separate adhesive is applied here, but the sheets are connected to each other by fusion.

It is particularly preferred within the meaning of the present invention that the welding connection is created by laser welding, because joining can then be effected with a high welding speed, a narrow and lean shape of the weld, and with low thermal warping. It is known that laser welding or laser beam welding is usually performed without supplying an additional material. The laser radiation is focused by means of an optical system, in which the laser beam has a typical diameter within a range of a few tenths of millimeters, which generates very high energy concentrations when the laser employed possesses the typical powers of a few kilowatts of laser power. Accordingly, it is possible according to the invention to bond several sheets together by an extremely thin weld on at least one outer edge of the stack of sheets by welding. One or several weld lines may be present on at least one edge, and in addition, a plurality of weld lines may also be present on at least one edge or one peripheral area. Thus, a stable connection of the individual sheets is achieved, so that the sheets can be peeled off simply.

In addition to the welding connection of the individual sheets according to the invention, it is of course also possible to additionally adhesive-bond the sheets, which may consist of the same or different materials and/or have different thicknesses, on part of the area or on the full area and/or peripherally.

Any sheets can be employed as the material for the sheets of the shims as long as they can be welded. This means that individual parts can be welded together to form components of the desired quality by the common effect of the suitability of the material to be welded (welding tendency), a construction suitable for welding (welding safety) and a suitable organization of manufacture (possibility to weld). Accordingly, metal foils, polymer sheets, fabrics, fiber composite materials, especially of glass, carbon, ceramic or aramid fibers, or mixtures of the above mentioned materials are particularly preferred according to the present invention.

Another embodiment of the present invention relates to a process for preparing the above defined edge-bonded or laminated shims. This process according to the invention is characterized in that edge-bonded or laminated shims comprising a plurality of sheets of the same or different kinds are bonded together at first by welding.

Thus, while the first steps of the preparation of the shims according to the invention correspond to those of the prior art, these are welded together on at least one side or edge after the individual sheets have been stacked. Accordingly, it is possible according to the invention to weld together not only cuboid or cubic shims, but also sheets stacked in a staircase manner, in which part of the "tread" is also bonded to the "riser" of the next sheets.

It is particularly preferred within the meaning of the present invention to use a radiation source, especially a laser radiation source, for welding the areas and/or edges.

Another embodiment of the present invention relates to the use of the shims, for example, in vehicle construction, aeronautics, electrical engineering or measuring technology, especially in generator or transformer construction.

It is also possible to employ the above defined shims for electrical insulation.

The shim according to the invention is a time- and cost-optimized alternative to known shims.

In a preferred embodiment of the present invention, it is possible to treat a loose or compressed stack of sheets peripherally with a radiation source.

Thus, shims are bonded to one another only in partial areas of the sheets, which is done only on the circumference, i.e., the front surfaces, of the sheet. In a staircase-shaped embodiment of the shim, the "step" is optionally also welded, which is usually not interfering, however.

This kind of bonding according to the invention enables a flexible radius design for curved surfaces whenever two curved surfaces must be kept at a distance in applications. Also, different types of materials can be bonded together with a wide variety of advantageous properties for the application, such as: avoiding contact corrosion, introducing sliding layers, integrating thicker interior material sheets, which introduce stiffness and higher pressure strengths and offer advantages in cost by reducing the number of layers. The shims according to the invention conform particularly well to curved surfaces, especially if there is no area-based connection between the sheets.

Therefore, it is particularly preferred to cut or punch out the individual sheets in the form of the end product as known from the prior art, in order to stack them exactly on one another. Subsequently, the layers are fixed, and then, the previously defined front surface(s)/peripheral edge(s) are treated. The connection should be elastic enough to offer mechanical strength for a low use area, and to resist the shocks from handling and transport.

The invention claimed is:

1. Edge-bonded or laminated shims comprising a plurality of sheets of the same or different kinds, characterized in that the sheets are bonded to one another by welding and are bonded together on at least one edge on one or several sites by welding.

2. The shims according to claim 1, characterized in that the sheets are bonded together on at least one edge by at least one weld line.

3. The shims according to claim 1, characterized in that the sheets are bonded together on at least one edge by a plurality of weld lines.

4. The shims according to claim 1, characterized in that the sheets are further bonded together with an adhesive on part of the area, the full area, and/or peripherally.

5. The shims according to claim 1, characterized in that the sheets comprise metal foils, polymer sheets, fabrics, fiber composite materials, especially of glass, carbon, ceramic or aramid fibers, or mixtures of the above mentioned materials.

6. A process for preparing edge-bonded or laminated shims comprising
providing a plurality of sheets of the same or different kinds, characterized in that the sheets are bonded to one another by welding;
cutting or punching individual sheets out at first in the form of the end product;
stacking said individual sheets on one another or in the form of a staircase;
fixing the layers, and
welding said sheets together at the front surface or peripheral edge.

7. The process according to claim 6, characterized in that the areas and/or edges are welded together using a radiation source.

* * * * *